(12) United States Patent
Järvenpää et al.

(10) Patent No.: US 10,681,276 B2
(45) Date of Patent: Jun. 9, 2020

(54) VIRTUAL REALITY VIDEO PROCESSING TO COMPENSATE FOR MOVEMENT OF A CAMERA DURING CAPTURE

(71) Applicant: Nokia Technologies Oy, Espoo (FI)

(72) Inventors: Toni Järvenpää, Akaa (FI); Peter Eskolin, Pirkkala (FI); Marja Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 15 days.

(21) Appl. No.: 16/036,310

(22) Filed: Jul. 16, 2018

(65) Prior Publication Data
US 2019/0045125 A1    Feb. 7, 2019

(30) Foreign Application Priority Data
Aug. 4, 2017    (GB) .................................. 1712569.1

(51) Int. Cl.
| | |
|---|---|
| *H04N 5/232* | (2006.01) |
| *G06T 7/33* | (2017.01) |
| *G06F 3/01* | (2006.01) |
| *G06T 7/246* | (2017.01) |
| *G06T 7/579* | (2017.01) |

(Continued)

(52) U.S. Cl.
CPC ..... *H04N 5/23258* (2013.01); *G02B 27/0172* (2013.01); *G06F 3/011* (2013.01); *G06F 3/013* (2013.01); *G06T 7/246* (2017.01); *G06T 7/33* (2017.01); *G06T 7/579* (2017.01); *H04N 5/23267* (2013.01); *G02B 27/0093* (2013.01); *G02B 2027/014* (2013.01); *G02B 2027/0138* (2013.01); *G06T 2207/10016* (2013.01)

(58) Field of Classification Search
CPC ............ H04N 5/23258; H04N 5/2259; H04N 5/2628; H04N 2013/0081; H04N 5/23267; G06T 7/579; G06T 2207/10016; G06T 7/33; G06T 7/246; G06T 3/20; G02B 27/0172; G02B 2027/0138; G02B 2027/014; G02B 27/0093; G06F 3/013; G06F 3/011
See application file for complete search history.

(56) References Cited

U.S. PATENT DOCUMENTS

| | | | |
|---|---|---|---|
| 9,538,081 B1* | 1/2017 | Zhou .................. | H04N 5/23248 |
| 2012/0206565 A1 | 8/2012 | Villmer | |
| 2017/0177082 A1* | 6/2017 | Michail ................. | G06T 19/006 |

(Continued)

FOREIGN PATENT DOCUMENTS

| | | |
|---|---|---|
| CN | 201575227 U | 9/2010 |
| CN | 105072433 A | 11/2015 |
| JP | H09282483 A | 10/1997 |

OTHER PUBLICATIONS

Search Report received for corresponding United Kingdom Patent Application No. 1712569.1, dated Feb. 5, 2018, 10 pages.

*Primary Examiner* — Maurice L. McDowell, Jr.
(74) *Attorney, Agent, or Firm* — Harrington & Smith

(57) ABSTRACT

A method is disclosed, comprising providing video data representing a plurality of frames of virtual reality content captured by a camera. A further step comprises determining a reference depth or object within the content. A further step comprises adjusting the position of content in one or more frames, based on the reference depth or object, to compensate for the movement of the camera during capture.

17 Claims, 10 Drawing Sheets

(51) Int. Cl.
  *G02B 27/01*  (2006.01)
  *G02B 27/00*  (2006.01)

(56) References Cited

U.S. PATENT DOCUMENTS

| | | |
|---|---|---|
| 2017/0221264 A1 | 8/2017 | Perry |
| 2017/0236332 A1* | 8/2017 | Kipman ............. G02B 27/0172 345/633 |
| 2017/0302903 A1* | 10/2017 | Ng ........................ G06T 15/205 |
| 2018/0046357 A1* | 2/2018 | Holzer ............... G06K 9/00664 |

* cited by examiner

VIRTUAL REALITY VIDEO PROCESSING TO COMPENSATE FOR MOVEMENT OF A CAMERA DURING CAPTURE

FIELD OF THE INVENTION

This invention relates to virtual reality video processing, particularly relating to methods and systems for stabilizing content.

BACKGROUND OF THE INVENTION

Virtual reality (VR) is a rapidly developing area of technology in which video content is provided to a VR display system. As is known, a VR display system may be provided with a live or stored feed from a video content source, the feed representing a VR space or world for immersive output through the display system. In some embodiments, audio is provided, which may be spatial audio. A virtual space or virtual world is any computer-generated version of a space, for example a captured real world space, in which a user can be immersed through a display system such as a VR headset. A VR headset may be configured to provide VR video and audio content to the user, e.g. through the use of a pair of video screens and headphones incorporated within the headset. Position and/or movement of the user device can enhance the immersive experience.

VR sickness may occur when exposure to a VR space or world causes symptoms similar to motion sickness. It has been theorized that this is at least partly due to the disagreement or disconnect between what the user sees and what the stimuli from the inner ear are sending to the brain. It may be particularly prevalent if the VR camera is moving during image capture.

Video stabilization techniques may be employed to avoid such effects. In general these may employ active mechanical systems for compensating the different camera motions in real time, and may be combined with content-stabilising image processing. For example, a camera gimbal may be used. A gimbal is a mechanical, typically motorised, external device for camera stabilization which aims to compensate for rotation around three axes. It has disadvantages in terms of its size, weight, power consumption, latency, noise and cost. It is considered less attractive for VR cameras where a panoramic or 360 degree field-of-view is required. This is because the gimbal may enter the field-of-view. In general, mechanical stabilization setups also have a limited compensation range, e.g. due to using servo motors, and image processing methods are often needed in addition. Even then, where there is rotational movement, known stabilization methods tend to cause distortion.

SUMMARY OF THE INVENTION

A first aspect of the invention provides a method comprising: providing video data representing a plurality of frames of virtual reality content captured by a camera; determining a reference depth or object within the content; and adjusting the position of content in one or more frames, based on the reference depth or object, to compensate for movement of the camera during capture.

A first component for adjusting the position of the content may comprise panning the one or more images in substantially the same direction as the movement of the camera.

A second component for adjusting the position of the content may comprise panning the one or more images in a direction substantially opposite to the camera movement, wherein the first component is dependent on the reference depth of object and the second component is dependent on an amount of camera movement.

The movement of the camera may comprise a rotation.

The reference depth or object may be determined based on user input received through a user interface.

The method may further comprise receiving a user input to select an object in the content, determining the depth of the selected object, and using the determined depth of the selected object as the reference depth.

The method may further comprise identifying one or more objects in the content having one or more predetermined characteristics, and wherein the reference depth or object is determined based on the depth of said one or more objects.

Identifying the one or more objects may comprise identifying objects having a predetermined size and/or shape.

The method may further comprise receiving data from a user device, which data is indicative of the gaze direction of a user when consuming the content, wherein the reference depth or object is determined based on the gaze direction.

A convergence depth may be determined based on data representing the gaze direction from both eyes of the user, the reference depth substantially corresponding to the convergence depth.

The method may further comprise identifying an object in the content as a selected object based on the gaze direction, determining the depth of the selected objected, and using the determined depth of the selected object as the reference depth.

The data indicative of the gaze direction may be received from eye tracking sensors of a virtual reality headset.

A plurality of reference depths, or objects, may be determined, and wherein the position of content corresponding to the different respective depths or objects may be adjusted differently.

The rotation may be horizontal rotation.

The amount of rotation in the direction of the movement of the camera may be inversely proportional on the reference depth or object.

The video data may be captured by a multi-camera device.

The video data may represent stereoscopic or 3D content.

The video data may represent 360 degree video data.

A second aspect of the invention provides a computer program comprising instructions that when executed by a computer control it to perform the method of any preceding definition.

A third aspect of the invention provides a non-transitory computer-readable medium having stored thereon computer-readable code, which, when executed by at least one processor, causes the at least one processor to perform a method, comprising: providing video data representing a plurality of frames of virtual reality content captured by a camera; determining a reference depth or object within the content; and adjusting the position of content in one or more frames, based on the reference depth or object, to compensate for movement of the camera during capture.

A fourth aspect of the invention provides an apparatus, the apparatus having at least one processor and at least one memory having computer-readable code stored thereon which when executed controls the at least one processor: to provide video data representing a plurality of frames of virtual reality content captured by a camera; to determine a reference depth or object within the content; and to adjust the position of content in one or more frames, based on the reference depth or object, to compensate for movement of the camera during capture.

A fifth aspect of the invention provides an apparatus comprising: means for providing video data representing a plurality of frames of virtual reality content captured by a camera; means for determining a reference depth or object within the content; and means for adjusting the position of content in one or more frames, based on the reference depth or object, to compensate for movement of the camera during capture.

BRIEF DESCRIPTION OF THE DRAWINGS

The invention will now be described, by way of non-limiting example, with reference to the accompanying drawings, in which.

DETAILED DESCRIPTION OF PREFERRED EMBODIMENTS

Embodiments herein relate to virtual reality (VR) and in particular to processing methods and systems for stabilising video data made up of a plurality of successive frames of VR content.

Embodiments are applicable to any form of VR system. Such methods and systems are applicable to related technologies, including Augmented Reality or Mixed Reality (AR/MR.)

The video data may be captured and provided from a camera such as a multi-camera device, e.g. Nokia's OZO camera. The methods and systems described herein are also applicable to content captured by monoscopic cameras, stereoscopic cameras, 360 degree panoramic cameras and other forms of VR camera.

The capturing camera may or may not employ a mechanical stabilizing system. If a mechanical stabilizing system is used, it may employ a levelling gimbal or tripod only, i.e. a two-dimensional stabilizing or two degrees-of-freedom system where vertical disparities are not produced.

The embodiments described herein may be performed at the capturing camera, at a device associated with the capturing camera (such as a post-processing computer), at a device associated with the user (such as a VR media player or a VR user terminal) or at some intermediate device between the source of the video data and the user device which displays the video data. The embodiments may therefore provide stabilization during capture, after capture and/or whilst the user is consuming the VR content.

In some embodiments, the captured video data may be stored remotely from the one or more users, and streamed to users over a network, e.g. an IP network such as the Internet. In some embodiments, the video data may be stored local to the one or more users on a memory device, such as a hard disk drive (HDD) or removable media such as a CD-ROM, DVD or memory stick. In some embodiments, the video data may be stored on a cloud-based system.

In embodiments described herein, it is assumed that the video data is stored remotely from one or more users, e.g. at a content server, and streamed over an IP network to one or more users. The data stream of the video data may represent one or more VR spaces or worlds for immersive output through the display system. In some embodiments, audio may also be provided, which may be spatial audio.

Figure 1:
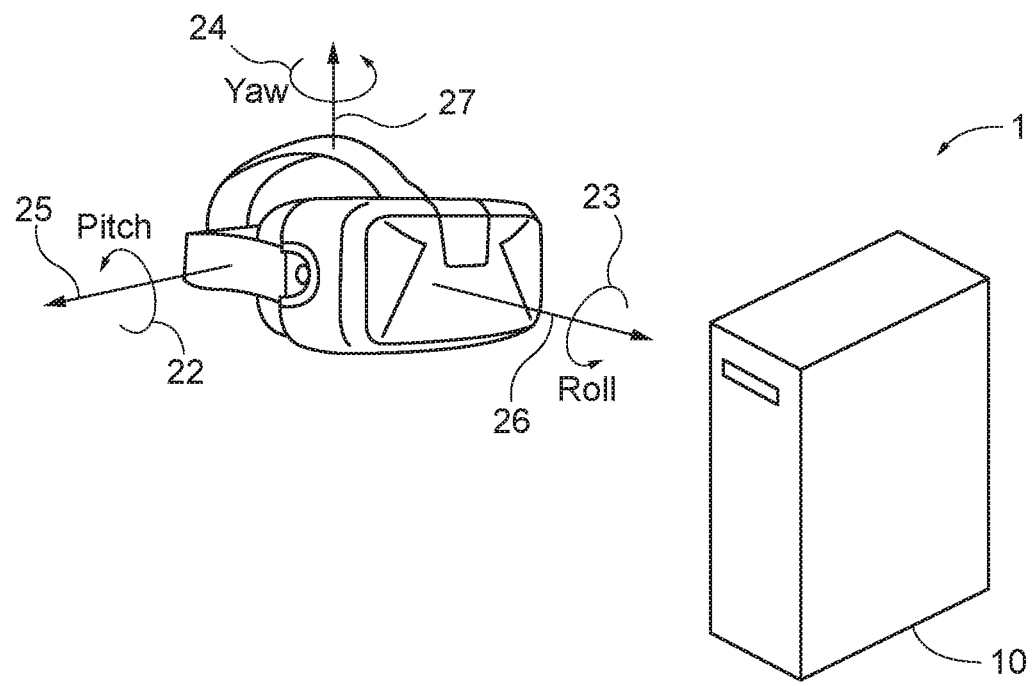
FIG. 1 is a perspective view of a VR display system, useful for understanding embodiments of the invention.

FIG. 1 is a schematic illustration of a VR display system 1 which represents user-end equipment. The VR display system 1 includes a user device in the form of a VR headset 20, for displaying video data representing a VR space, and a VR media player 10 for rendering the video data on the VR headset 20. In some embodiments, a separate user control (not shown) may be associated with the VR display system 1, e.g. a hand-held controller.

In the context of this specification, a virtual space or world is any computer-generated version of a space, for example a captured real world space, in which a user can be immersed. The VR headset 20 may be of any suitable type. The VR headset 20 may be configured to provide VR video and audio content data to a user. As such, the user may be immersed in virtual space.

The VR headset 20 receives the VR video data from a VR media player 10. The VR media player 10 may be part of a separate device which is connected to the VR headset 20 by a wired or wireless connection. For example, the VR media player 10 may include a games console, or a PC configured to communicate visual data to the VR headset 20.

Alternatively, the VR media player 10 may form part of the VR headset 20.

Here, the VR media player 10 may comprise a mobile phone, smartphone or tablet computer configured to play content through its display. For example, the VR media player 10 may be a touchscreen device having a large display over a major surface of the device, through which video content can be displayed. The VR media player 10 may be inserted into a holder of a VR headset 20. With such VR headsets 20, a smart phone or tablet computer may display the video data which is provided to a user's eyes via respective lenses in the VR headset 20. The VR display system 1 may also include hardware configured to convert the device to operate as part of VR display system 1. Alternatively, the VR media player 10 may be integrated into the VR headset 20. The VR media player 10 may be implemented in software. In some embodiments, a device comprising VR media player software is referred to as the VR media player 10.

Figure 2:
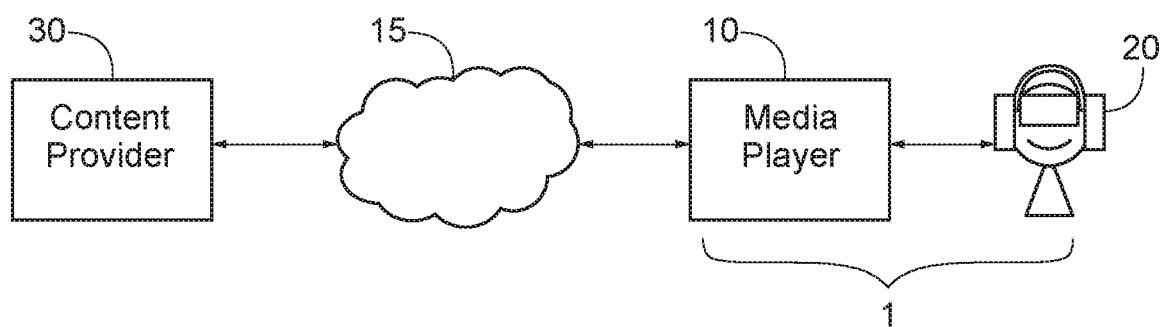
FIG. 2 is a block diagram of a computer network including the FIG. 1 VR display system, according to embodiments of the invention.

The VR display system 1 may include means for determining the spatial position of the user and/or orientation of the user's head. This may be by means of determining the spatial position and/or orientation of the VR headset 20. Orientation of the VR headset may be for example represented by yaw 24, pitch 22, and roll 23, that is, rotations about corresponding axes 27, 25, 26, as illustrated in FIG. 2. Over successive time frames, a measure of movement may therefore be calculated and stored. Such means may comprise part of the VR media player 10. Alternatively, the means may comprise part of the VR headset 20. For example, the VR headset 20 may incorporate motion tracking sensors which may include one or more of gyroscopes, accelerometers and structured light systems. These sensors generate position data from which a current visual field-of-view (FOV) is determined and updated as the user, and so the VR headset 20, changes position and/or orientation. The VR headset 20 will typically comprise two digital screens for displaying stereoscopic video images of the virtual world in front of respective eyes of the user, and also two speakers for delivering audio, if provided from the VR media player 10. In some embodiments the VR headset 20 may comprise a single digital screen having separate regions intended for each eye of the user. The embodiments herein, which primarily relate to the delivery of VR content, are not limited to a particular type of VR headset 20.

In some embodiments, the VR display system 1 may include means for determining the gaze direction of the user. In some embodiments, gaze direction may be determined using eye gaze tracking sensors provided in the VR headset 20. The eye gaze tracking sensors may, for example, be miniature cameras installed proximate the video screens which identify in real-time the pupil position of each eye. In some embodiments the eye gaze tracking system may include infrared light emitting diodes that illuminate the eye cornea resulting in better detection of the pupil contour and producing corneal reflections such as glints that can be detected by the miniature cameras and be used as a means to increase the gaze tracking accuracy and robustness. The identified positions may be used to determine which part of the current visual FOV is of interest to the user. This information can be used for example to identify one or more sub-sets of content within the video data, e.g. objects or regions projected at a particular depth within the content. For example, the convergence point of both eyes may be used to identify a reference depth.

The VR display system 1 may be configured to display VR video data to the VR headset 20 based on spatial position and/or the orientation of the VR headset. A detected change in spatial position and/or orientation, i.e. a form of movement, may result in a corresponding change in the visual data to reflect a position or orientation transformation of the user with reference to the space into which the visual data is projected. This allows VR content data to be consumed with the user experiencing a stereoscopic or a 3D VR environment.

Audio data may also be provided to headphones or speakers provided as part of the VR headset 20. The audio data may represent spatial audio source content. Spatial audio may refer to directional rendering of audio in the VR space or world such that a detected change in the user's spatial position or in the orientation of their head may result in a corresponding change in the spatial audio rendering to reflect a transformation with reference to the space in which the spatial audio data is rendered.

The angular extent of the environment observable through the VR headset 20 is called the visual field of view (FOV). The actual FOV observed by a user depends on the inter-pupillary distance and on the distance between the lenses of the VR headset 20 and the user's eyes, but the FOV can be considered to be approximately the same for all users of a given display device when the VR headset is being worn by the user.

Referring to FIG. 2, a remote content provider 30 may store and transmit streaming VR content data for output to the VR headset 20. Responsive to receive or download requests sent by the VR media player 10, the content provider 30 streams the VR data over a data network 15, which may be any network, for example an IP network such as the Internet. The data network 15 may be also a unidirectional network such as a multicast network or a broadcast network.

The remote content provider 30 may or may not be at the location or system where the VR video is captured, created and/or processed.

For illustration purposes, we may assume that the content provider 30 also captures, encodes and stores the VR content, as well as streaming it responsive to signals from the VR display system 1.

Figure 3:
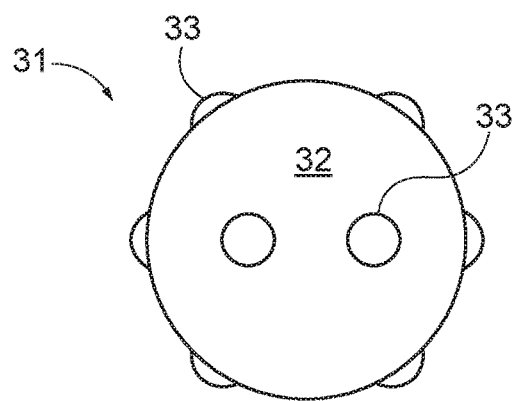
FIG. 3 is a side view of a VR multi-camera system, employed in embodiments of the invention.

Referring to FIG. 3, an example VR capturing device is in the form of a multi-camera system 31. The multi-camera system 31 comprises a generally spherical body 32 around which are distributed a plurality of video cameras 33. For example, eight video cameras 33 may be provided, each having an approximate 195° field-of-view in fisheye projection. The multi-camera system 31 may therefore capture 360° images by stitching images from the individual cameras 33 together, taking into account overlapping regions. Nokia's OZO camera is one such example. Multiple microphones (not shown) may also be distributed around the body 32 for capturing spatial audio.

Figure 4:
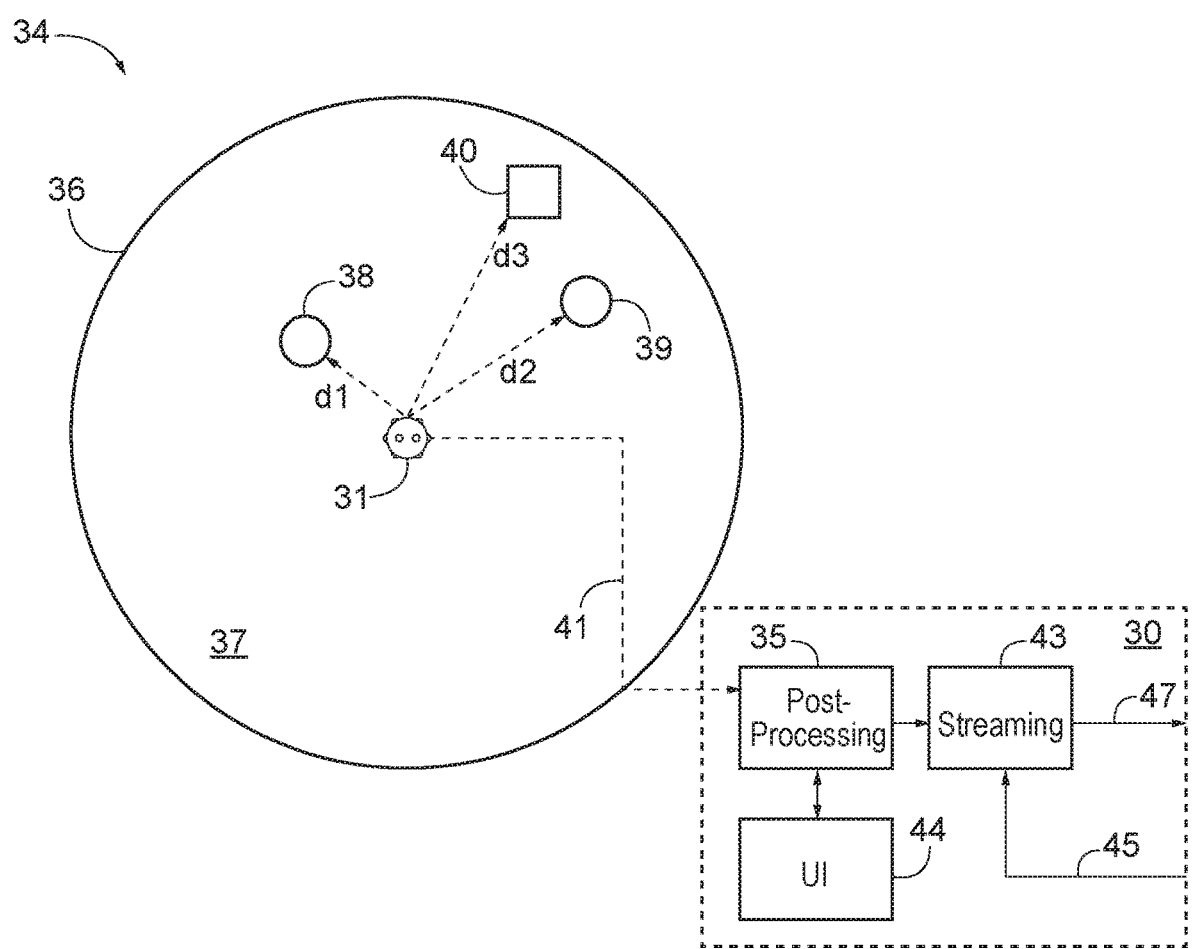
FIG. 4 is a schematic diagram of an example VR capture scenario which employs the FIG. 3 multi-camera system.

Referring to FIG. 4, an overview of a VR capture scenario 34 is shown. The VR capture scenario 34 is shown together with a post-processing module 35 and an associated user interface 44. FIG. 4 shows in plan-view a real world space 36 which may be an outdoors scene, a concert, a conference or indeed any real-world situation. The multi-camera system 31 may be supported on a floor 37 of the real-world space 36 in front of one or more objects 38, 39, 40. The objects 38, 39, 40 may be static objects or they may move over time. One or more of the objects 38, 39, 40 may be a person, an animal, a natural or geographic feature, a celestial body etc. One or more of the objects 38, 39, 40 may generate audio, e.g. a singer, a performer or a musical instrument.

As mentioned previously, the multi-camera system 31 may or may not be used with a mechanical stabilization means. It will be appreciated however that such a mechanical stabilization means should not interfere or impinge significantly on the FOV.

The position of the multi-camera system 31 may be known, e.g. through predetermined positional data or signals derived from a positioning tag on the VR capture device.

One or more of the objects 38, 39, 40 may carry a positioning tag. A positioning tag may be any module capable of indicating through data its respective spatial position to the post-processing module 35. For example a positioning tag may be a high accuracy indoor positioning (HAIP) tag which works in association with one or more HAIP locators within the space 36. HAIP systems use Bluetooth Low Energy (BLE) communication between the tags and the one or more locators. For example, there may be four HAIP locators mounted on, or placed relative to, the multi-camera system 31. A respective HAIP locator may be to the front, left, back and right of the multi-camera system 31. Each tag sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The post-processing module 35 is a processing system, possibly having an associated user interface (UI) 44 which may be used for example by an engineer or mixer to monitor, modify and/or control any aspect of the captured video and/or audio. As shown in FIG. 4, the post-processing module 35 receives as input from the multi-camera system 31 spatial video data (and possibly audio data) and positioning data, through a signal line 41. Alternatively, the positioning data may be received from a HAIP locator. The post-processing module 35 may also receive as input from one or more of the objects 38, 39, 40 audio data and positioning data from respective positioning tags through separate signal lines. The post-processing module 35 generates and stores the VR video and audio data for output to a user device, such as the VR system 1 shown in FIGS. 1 and 2, via a signal line 45.

The input audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input from the Nokia OZO® VR camera, if used for the multi-camera system 31. The microphone signals can then be rendered to loudspeaker or binaural format for playback.

Associated with the post-processing module 35 is a streaming system 43, for example a streaming server. The streaming system 43 may be an entirely separate system from the post-processing module 35. Signal line 45 indicates an input received over the network 15 from the VR system 1. The VR system 1 indicates through such signalling the data to be streamed dependent on position and/or orientation of the VR display device 20. Reference numeral 47 indicates the signal line to the network 15.

It will be appreciated that the video data captured by the multi-camera system 31 may represent objects positioned at different respective distances from the multi-camera system. For example, the objects 38, 39, 40 are located at different respective distances $d_1$, $d_2$, $d_3$ from the multi-camera system 31. These different distances $d_1$, $d_2$, $d_3$ may correspond to respective depth planes, each of which may comprise other content on substantially the same plane.

The captured video data may subsequently be processed using known methods so that the rendered video data, when output to the VR display device 20 in the consumption phase, simulates the captured content at the respective depth planes. That is, when processed into stereoscopic video data (with slightly differing images being provided to the respective screens) the objects 38, 39, 40 may appear to be at their respective distances $d_1$, $d_2$, $d_3$ from the user's perspective. This is illustrated graphically in FIG. 5a, which shows a single frame 50 of panoramic content based on the FIG. 4 scenario 34.

Figure 5:
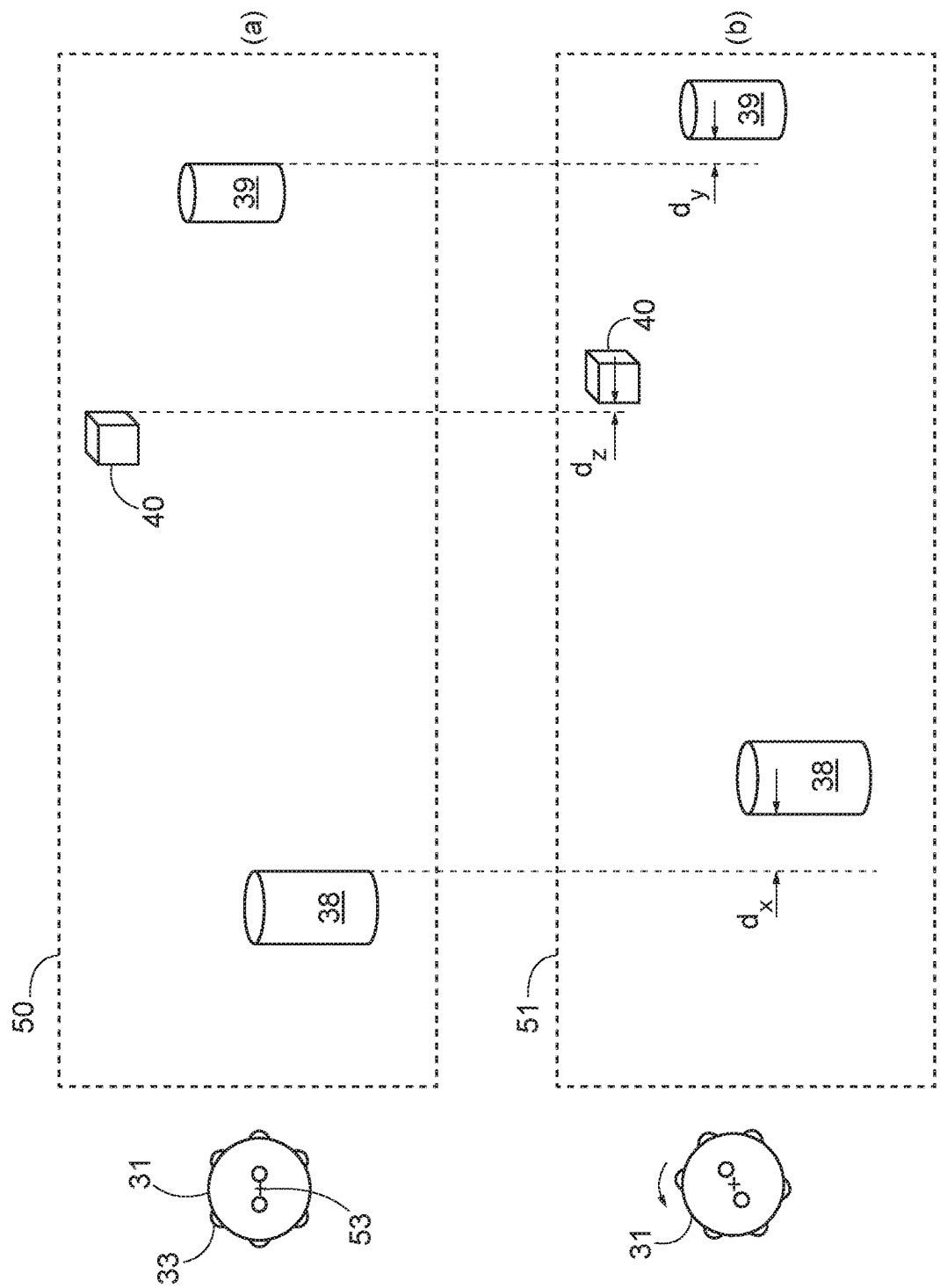
FIGS. 5a and 5b respectively show a first, and a subsequent frame of panoramic content, captured by the FIG. 3 multi-camera system.

Moreover, if the multi-camera system 31 moves during the capture phase, for example by rotating about the z-axis 53, objects on different depth planes change their relative horizontal positions; objects closer to a given camera 33, i.e. on a closer depth plane, change by a greater distance than those further away. As shown in FIG. 5b, the first object 38 on the closest depth plane changes position by a greater distance $d_x$ than the second object 39; the second object changes position by a greater distance $d_y$ than that of the third object 40, i.e. $d_x > d_y > d_z$.

It will be appreciated that multiple objects (or scenery) located on the same depth plane will typically move by substantially the same amount.

It will also be appreciated that objects in the far distance, for example clouds or a celestial body such as the Sun, may be considered to be at an infinite distance from the multi-camera system 31. As such, there may be no change, or very little change, in horizontal position as the camera moves.

When a camera, in this case the multi-camera system 31, moves during capture, the viewing user may experience discomfort if their focus of visual attention does not move at all, or their focus of visual attention moves by an insignificant amount. Therefore, embodiments herein are provided to mitigate this by providing stabilization to compensate for movement, in particular, horizontal rotational movement. In some embodiments, therefore, this is achieved without needing to employ a bulky and heavy mechanical stabilization system to cater for this type of camera movement and which does not impinge on the camera's FOV. Embodiments of the invention have been described using rotation of a spherical multi-camera system as an example. It is however appreciated that the methods disclosed herein are applicable to any kind of movement of a camera device, for example to stabilize desired objects in case of lateral or vertical movements of a single camera.

In overview, the stabilization methods and systems involve adjusting the position of content in one or more frames of captured VR content based on a reference depth or object. An aim of this is to compensate for the rotation of the camera during capture.

The stabilization method may be performed at one or more of a capturing device, a post-processing system, and the user-end system. In the shown examples, the stabilizations method may be performed at one or more of the multi-camera system 31, the post-processing module 35 and the media player 10.

Figure 6:
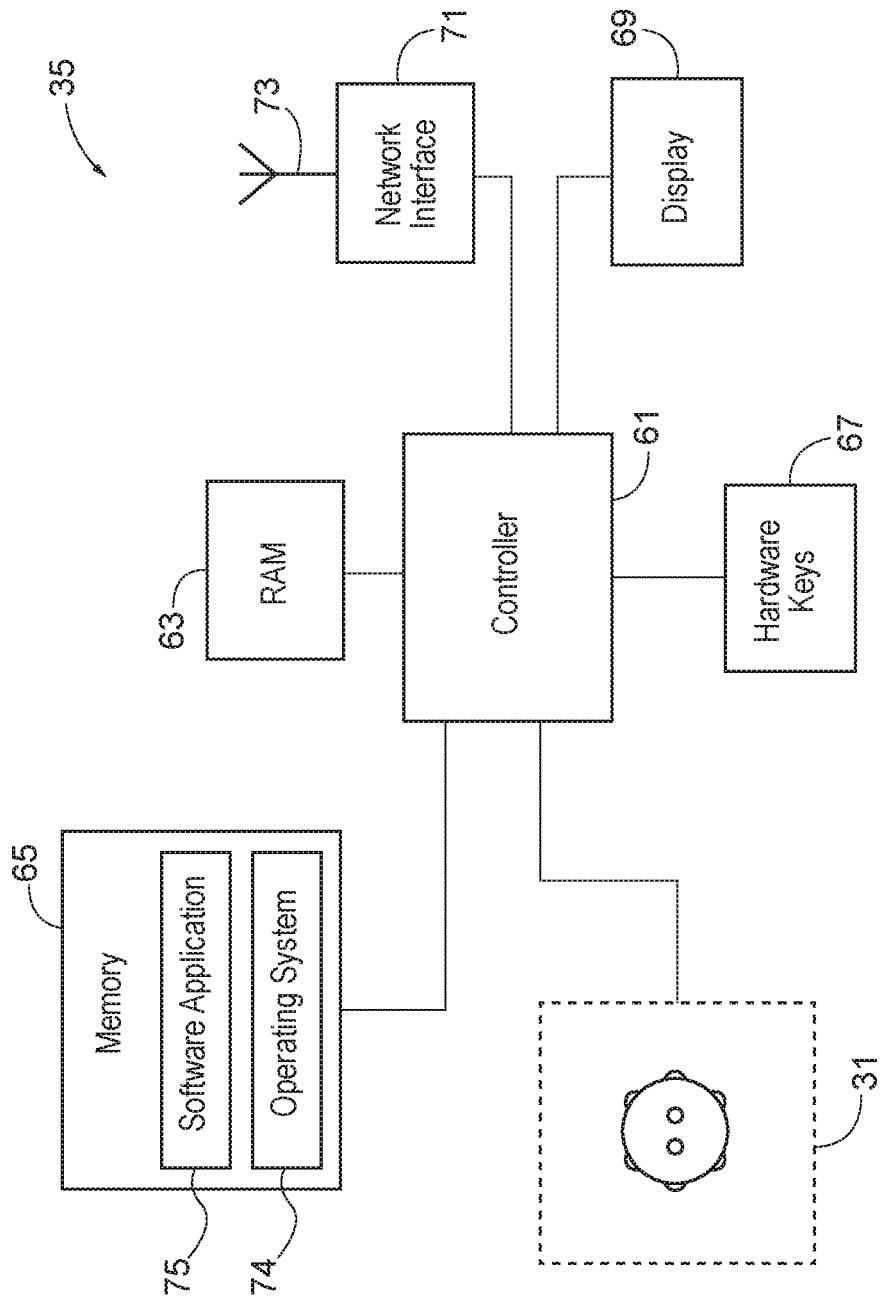
FIG. 6 is a schematic diagram of components of a video post-processing system of the FIG. 2 computer network, according to embodiments of the invention.

Referring to FIG. 6, for example, components of the post-processing module 35 are shown. Similar components may be provided in the other systems if the embodiments are performed elsewhere. The post-processing module 35 may comprise a controller 61, RAM 63, a memory 65, and, optionally, hardware keys 67 and a display 69. The post-processing module 35 may comprise a network interface 71, which may be a data port for connecting the system to the network 15 or the streaming module 43.

The network interface 71 may additionally or alternatively comprise a radiofrequency wireless interface for transmitting and/or receiving the post-processed data using a wireless communications protocol, e.g. WiFi or Bluetooth. An antenna 73 may be provided for this purpose.

The controller 61 may receive captured video data from the multi-camera system 31. One or more control signals may be provided from the controller 61 to the multi-camera system 31.

The memory 65 may be a non-volatile memory such as read only memory (ROM), a hard disk drive (HDD) or a solid state drive (SSD). The memory 65 stores, amongst other things, an operating system 74 and may store software applications 75. The RAM 63 is used by the controller 61 for the temporary storage of data. The operating system 74 may contain code which, when executed by the controller 61 in conjunction with the RAM 63, controls operation of each of the hardware components of the post-processing system 35.

The controller 61 may take any suitable form. For instance, it may be a microcontroller, plural microcontrollers, a processor, plural processors, or processor circuitry.

In some embodiments, the post-processing system 35 may also be associated with external software applications not stored on the camera. These may be applications stored on a remote server device and may run partly or exclusively on the remote server device. These applications may be termed cloud-hosted applications. The camera 1 may be in communication with the remote server device in order to utilize the software application stored there.

Figure 7:
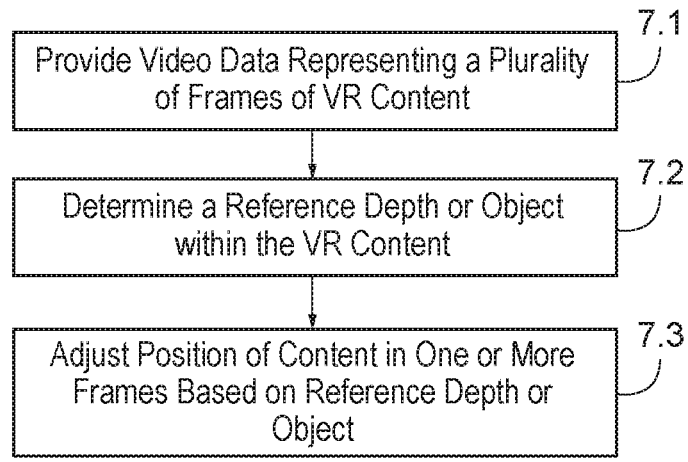
FIG. 7 is a flow diagram showing processing steps performed by the video post-processing system in a video stabilisation method, according to embodiments of the invention.

FIG. 7 is a flow diagram indicating steps performed by one or more software applications in accordance with embodiments. For example, FIG. 7 may represent steps performed by the software application 75 in FIG. 6, which is a post-processing application.

In a first step 7.1, video data representing a plurality of captured frames of VR content is provided. For example, the video data may be received from the multi-camera system 31 in real-time or near real-time, or the video data may be provided from some other source such as on a memory module.

In a second step 7.2, a reference depth or object within the VR content is determined. For example, a depth map of the surroundings can be generated using the individual cameras of the VR camera. A certain reference depth or distance can be selected from the VR content using this depth map. Also, alternatively or additionally, the depth of each object in the scene can be processed from the depth data and thus an object depth can be used as the reference depth.

In a third step 7.3, the position of content in one or more frames of the VR content is adjusted based on the reference depth or object.

In some embodiments, the adjusted content may be a subset of content from a frame. For example, the adjusted content may be one or more objects captured in a larger overall scene. For example, objects in the foreground may be moved relative to objects located behind them in the VR content.

Figure 8:
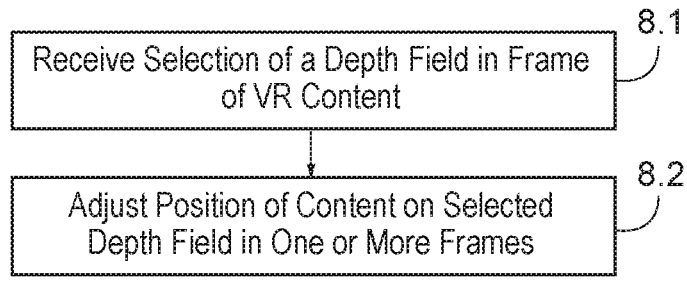
FIG. 8 is a flow diagram showing processing steps for adjusting the position of content based on a received depth field, according to embodiments of the invention.

In some embodiments, the adjusted content may be all objects located on a particular depth field, as determined by step 7.2. For example, referring to FIG. 8, step 7.2 may comprise a step 8.1 of receiving selection of a depth field in a frame of VR content. A subsequent step 8.2, which may correspond with step 7.3, may comprise adjusting the positon of content on the selected depth field, which may comprise one or more objects, for example.

Figure 9:
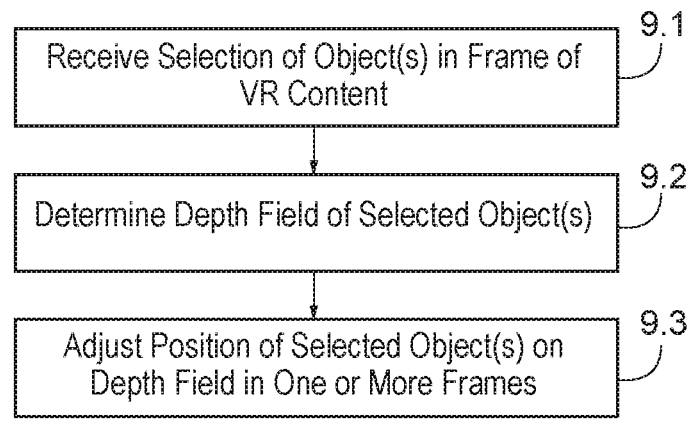
FIG. 9 is a flow diagram showing processing steps for adjusting the position of content based on selection of an object, according to embodiments of the invention.

Alternatively, referring to FIG. 9, step 7.2 may comprise a step 9.1 of receiving selection of one or more objects in a frame of VR content. A subsequent step 9.2 may comprise determining the depth field of the one or more selected objects. A subsequent step 9.3, which may correspond with step 7.3, may comprise adjusting the position of the object(s) on the determined depth field(s).

In step 7.2, the reference depth or object may be determined based on user input received through a user interface, for example using the display 69 which may correspond to the user interface 44 shown in FIG. 3.

Figure 10:
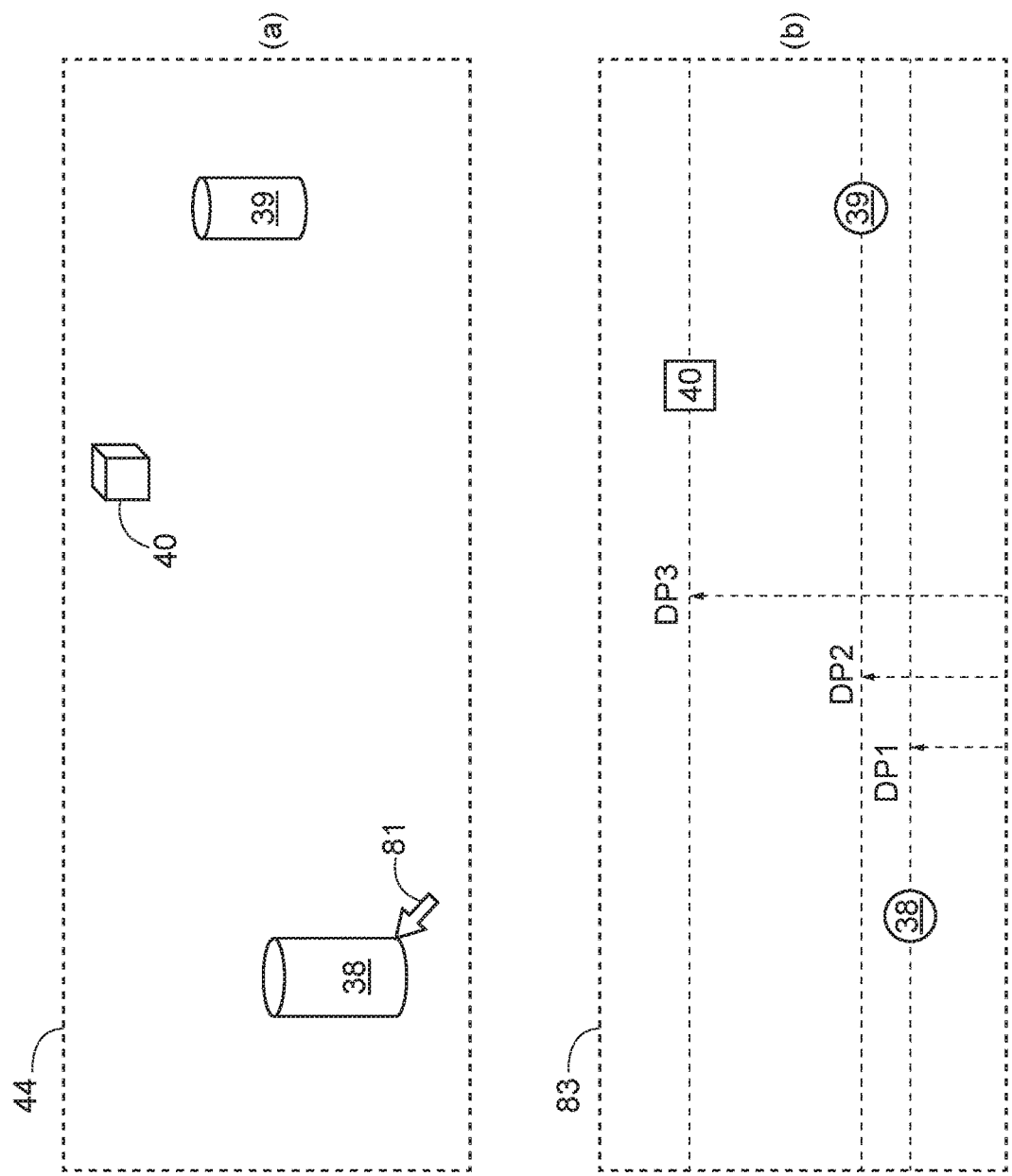
FIGS. 10a and 10b respectively show a user interface enabling user-selection of an object, in accordance with the FIG. 9 steps, and a graphical representation of depth fields of objects shown on the user interface.

Referring to FIG. 10a, for example, this may comprise receiving data or a signal responsive to a user input to select an object in the VR content, determining the depth of the selected object, and using the determined depth as the reference depth. In the Figure, the first object 38 is selected using a pointer 81. Alternative user input means such as touch screen interfaces may be used for this purpose. FIG. 10b illustrates schematically three depth planes DP1, DP2, DP3 associated with the respective first, second and third objects 38, 39, 40. In this example, selection of the first object 38 results in selection of DP1 as the reference depth.

Alternatively, or additionally, the reference depth may be selected directly without selection of a particular object. For example, the user interface 44 may display a plan-view interface 83 indicating the depth fields DP1, DP2, DP3 for user selection. Alternatively, or additionally, a numerical entry field for receiving a depth value may be provided.

In some embodiments, step 7.2 may comprise identifying one or more objects in the content having one or more predetermined characteristics, and the reference depth or object may be determined based on the depth of said one or more objects. For example, the software application 75 may automatically identify one or more objects using known object matching algorithms. For example, the software application 75 may automatically identify one or more objects of a predetermined size and/or shape, or within predetermined ranges.

Figure 11:
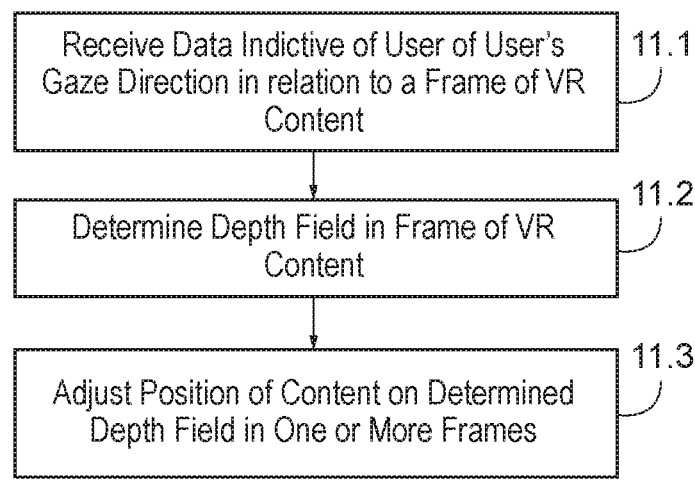
FIG. 11 is a flow diagram showing processing steps for determining a depth field based on a user's gaze direction, according to embodiments of the invention.

In some embodiments, step 7.2 may further comprise receiving data from a user device, which data is indicative of the gaze direction of a user when consuming the content, wherein the reference depth or object is determined based on the gaze direction. For example, referring to FIG. 11, step 7.1 may comprise a first step 11.1 of receiving data from the VR headset 20 indicative of the user's gaze direction in relation to a frame of VR content. A subsequent step 11.2 may comprise determining the depth field corresponding to the user's gaze direction. A subsequent step 11.3, which may correspond to step 7.3, may comprise adjusting the position of content on the determined depth field in step 11.2. For example, a convergence depth may be determined based on the gaze direction from both eyes of the user, the depth field substantially corresponding to the convergence depth.

Figure 12:
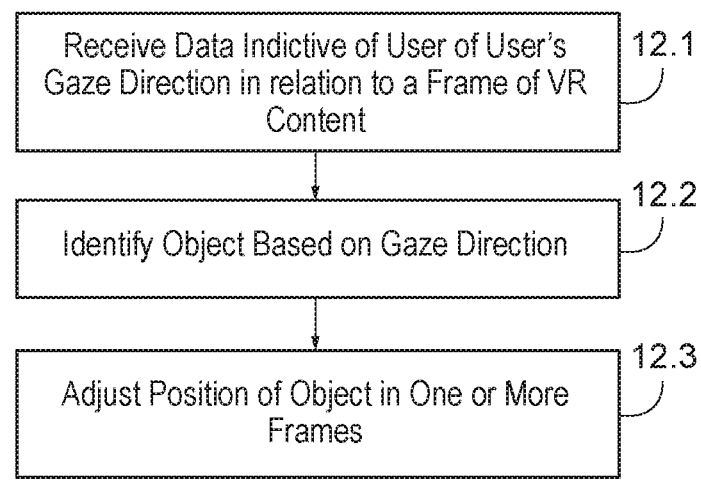
FIG. 12 is a flow diagram showing processing steps for determining object identification based on a user's gaze direction, according to embodiments of the invention.

Alternatively, or additionally, referring to FIG. 12, step 7.2 may further comprise receiving data from a user device, e.g. VR headset 20, indicative of the user's gaze direction in relation to a frame of VR content. A subsequent step 12.2 may comprise identifying an object in the content based on the gaze direction. A subsequent step 12.3, which may correspond to step 7.3, may comprise adjusting the position of the object (or all objects on the same depth plane) in one or more frames.

The data indicative of the gaze direction may be received from eye tracking sensors of the VR headset 20.

In some embodiments, the position adjustment may be by means of rotating, or panning, the content in substantially the direction of camera rotation, e.g. about the vertical z axis, during capture to stabilise content at a reference plane. An overall adjustment may comprise a first component to rotate the image in the direction of camera rotation to provide stabilization of objects located at a desired reference plane, and a second component to rotate the image opposite to that of camera rotation to compensate for the switching of the individual cameras capturing certain content. This form of stabilization therefore compensates for rotation of the camera and stabilises the view at a desired reference plane.

Figure 13:
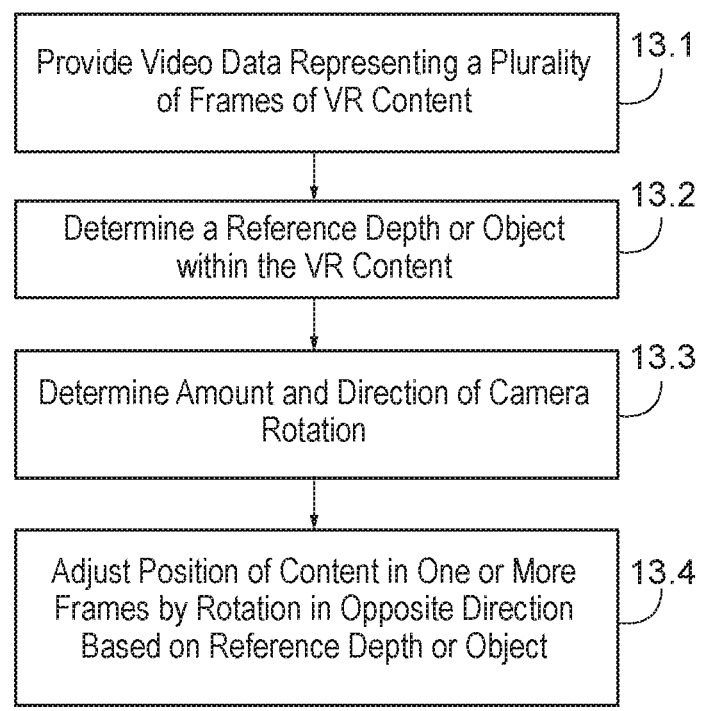
FIG. 13 is a flow diagram showing processing steps for compensating for camera rotation, according to embodiments of the invention.

Referring to FIG. 13, the post-processing application 75 may comprise a first step 13.1 of providing video data representing a plurality of captured frames of VR content.

In a second step 13.2, a reference depth or object within the VR content is determined.

In a third step 13.3, the amount and direction of camera rotation is determined.

In a fourth step 13.4, the position of content in one or more frames of the VR content is adjusted by rotation based on the reference depth or object. As discussed above, a first component of the rotation may comprise panning in the direction of camera rotation to provide stabilisation for a desired reference plane. The rotation may also comprise a second component in an opposite direction to that of camera rotation to compensate for the camera rotation itself. Therefore, an overall rotation that stabilizes the view for a desired reference distance may comprise panning the image opposite to the direction of camera rotation less than the amount of actual camera rotation.

The rotation may be horizontal rotation. The amount of rotation in the substantially same direction, i.e. the first component, may be dependent on the reference depth or distance from the camera to the reference object, for example inversely proportional to the reference depth or distance to the reference object. Rotation of an image may be also referred to as panning or rolling of an image. In some embodiments an image may include a visible portion and an invisible portion adjacent to or surrounding the visible portion. When an image is rotated, panned, or rolled, pixels that are initially located at the invisible portion close to the edge of the visible portion may be appear in the visible portion and pixels initially located in the visible portion close to the opposite edge of the visible portion may no longer appear in the visible portion. Therefore, the size of the visible portion may remain the same after rotation, panning, or rolling.

In some embodiments, the video data may represent stereoscopic or 3D content. In that case, adjustment of the content may be applied both to a left-eye image and a right-eye image of a stereoscopic image pair. The amount of panning may be the same for the right-eye image and left-eye image.

In some embodiments, the video data may represent 360 degree video data.

The above embodiments may be performed by software provided at the media player 10 instead of at the post-processing module 35. This is particularly convenient for applications involving gaze detection, because the VR headset 20 is proximate the media player 10 and hence the gaze direction data does not need to be transmitted over the network 15. This may reduce the latency in receiving the gaze direction data and hence provide more effective content stabilization.

Therefore, the embodiments may performed during capture and at playback.

For completeness, an embodiment will now be described in graphical terms with reference to FIG. 14.

Figure 14:
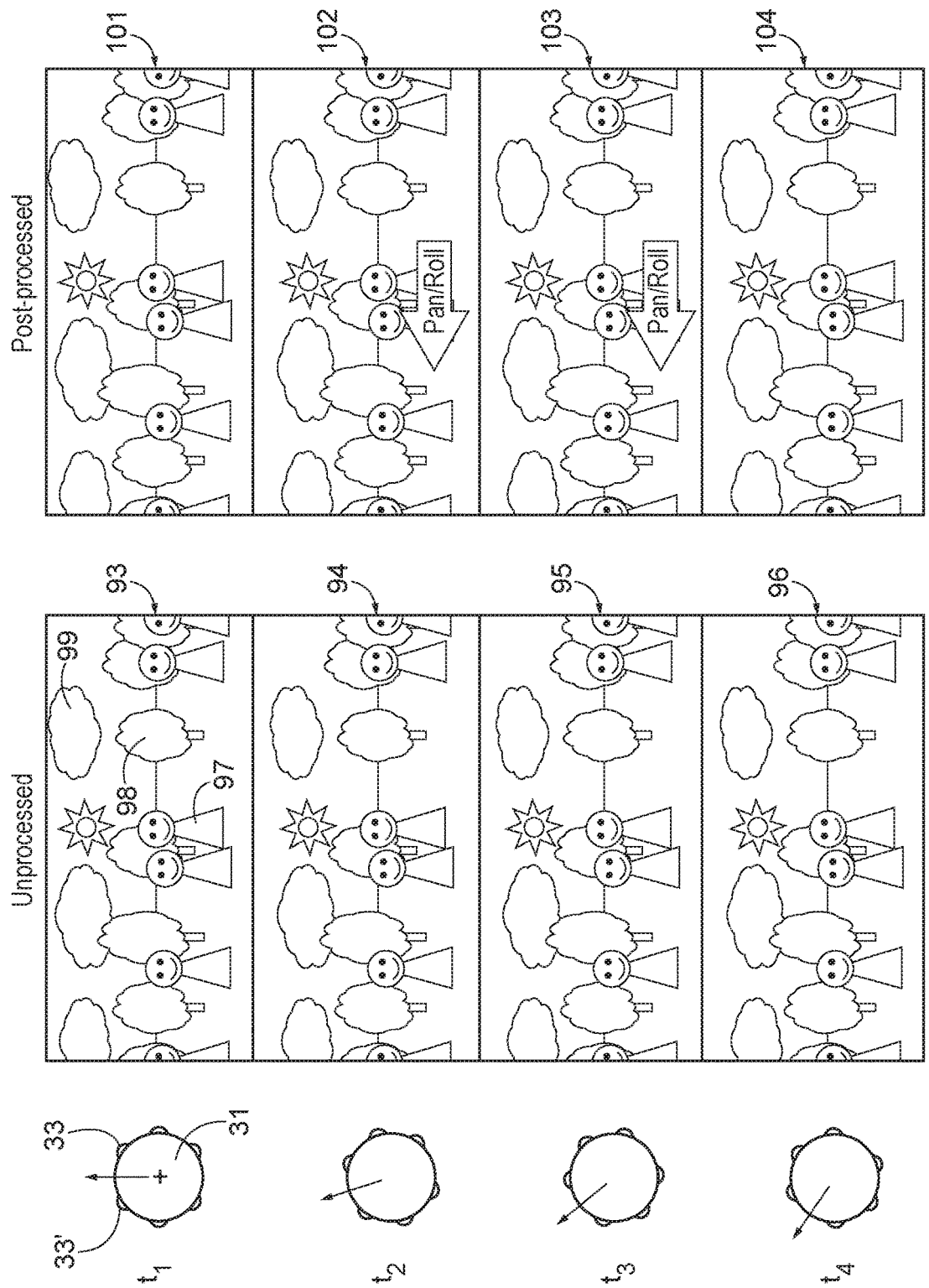
FIG. 14 shows a plurality of frames of pre and post-processed video data, captured during motion of the FIG. 3 multi-camera system, useful for understanding embodiments of the invention.

The left-hand column of FIG. 14 indicates four poses or rotations (about the z-axis) of the multi-camera system 31 at capture times t1-t4. The centre column of the Figure indicates unprocessed images 93-96 of a monoscopic equirectangular panorama when captured at the respective times t1-t4. Similar techniques would apply to stereoscopic images and other projections such as cube maps etc. The first three images 93, 94, 95 are captured by a single camera 33 of the multi-camera system 31 and hence it will be observed that objects 97 having a closer depth field shift rightwards by a greater amount than objects 98 having a deeper depth field. Similarly, objects 99 farthest away from the camera 33 have little or no movement. The fourth image 96 is captured by an adjacent camera 33' to that which captured the first three images 93, 94, 95 and hence the fourth image is identical to the first image.

In accordance with embodiments, a reference depth or object may be determined. In this example, the foreground objects 97 (the people) are selected using one of the aforementioned methods. Stabilisation is achieved in the horizontal direction by panning or rolling the image such that foreground objects 97, which correspond to the selected reference plane in this example, will be located at the same position at each capture time t1-t4, as can be seen by comparing post-processed images 102, 103 to image 101, which is identical unprocessed image 93. The background objects 99 (cloud) will also move leftwards, which causes the background objects to appear at a slightly different position, as can be seen by comparing the post-processed images 102, 103 to image 101. Effectively, the panning/rolling effect results in moving the background objects 98, 99, which are deeper in the VR content, leftwards relative to the foreground objects 97 which have been now stabilized at the centre of the image. The right-hand column of FIG. 14 shows this with reference to the first to third images 101, 102, 103 which have been post-processed. By adjusting the amount of panning/rolling it is possible to control the depth plane that is most optimally stabilized.

In the shown example, the tree objects 98 are located at an intermediate depth plane between the people 97 and clouds 99. Stabilisation using people 97 as reference objects (or reference plane) causes the tree objects 98 to move slightly left in the post-processed images 102, 103. Tree objects 98 are moved in the horizontal direction in the same direction as the clouds 99, but to a lesser degree (inversely proportional to the depth relative to the camera. The background objects 99 may exhibit little or no movement in the unprocessed images given their high distance from the camera 33. In the post-processed images the background objects exhibit a movement corresponding to the amount of panning, because the post-processed images have been stabilized with respect to the foreground objects, i.e. the desired reference plane.

The fourth image 104 is the post-processed version of the image 96 which is captured by an adjacent camera 33'. In this example, position of adjacent camera 33' at time instant t4 corresponds to position of camera 33 at time instant t1. Unprocessed image 96 captured by adjacent camera 33' at instant t4 is therefore identical to the unprocessed image 93 captured by camera 33 at time instant t1 and consequently no panning or rolling is needed to obtain post-processed image 104.

Other methods for adjustment may be employed, including optical flow methods.

Figure 15:
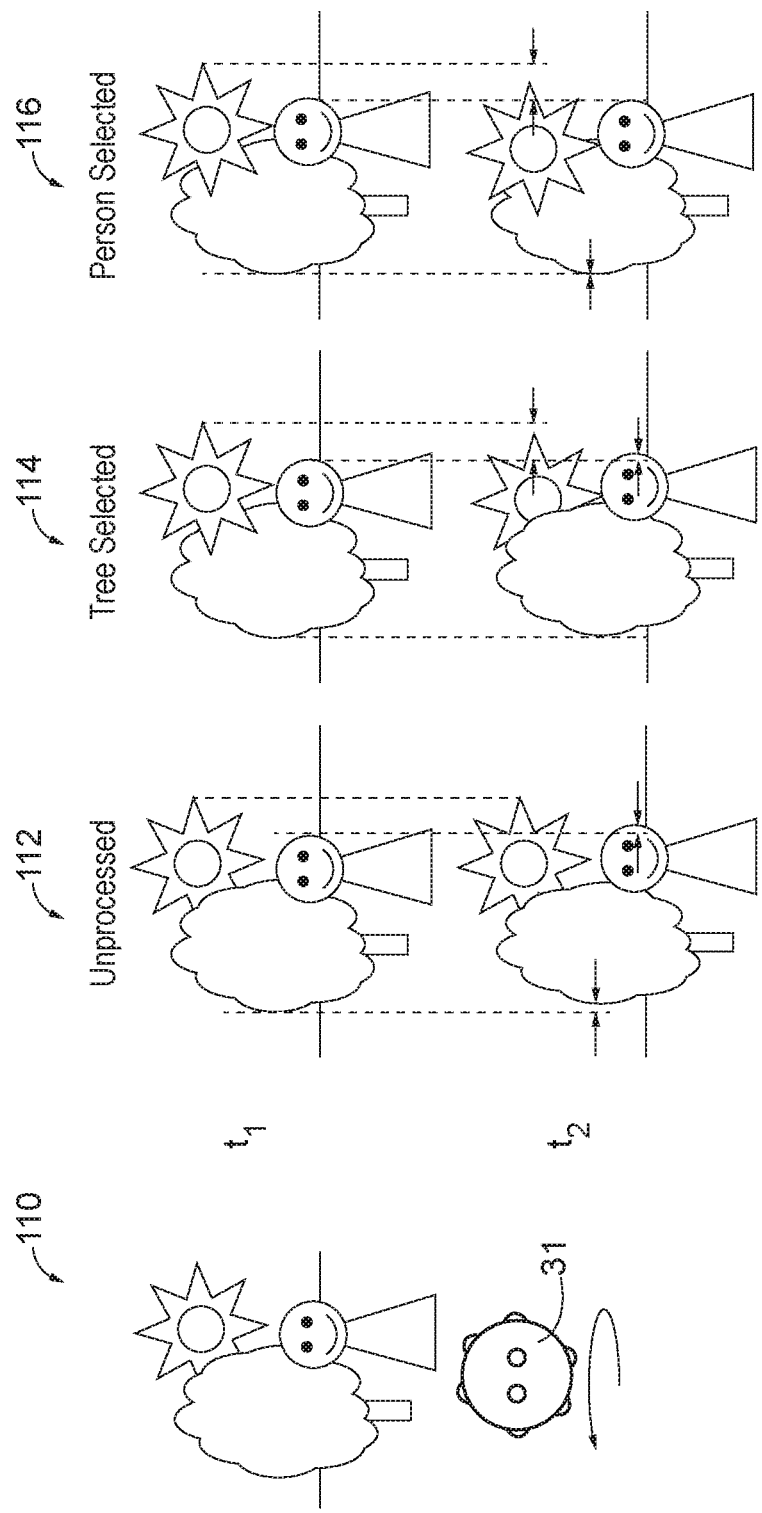
FIG. 15 shows first and second frames of pre and post-processed video data, captured during motion of the FIG. 3 multi-camera system, useful for understanding other embodiments of the invention.

For completeness, FIG. 15 shows in another example the resulting modifications, for two time-frames, based on leftwards rotation of the camera 33 relative to a stationary scene 110. The unprocessed version 112 indicates that, whilst the far-away sun object remains relatively static, the tree object moves rightwards by a first amount and the person object moves rightwards by a second, greater amount, due to being closer to the camera 31. If the tree object is selected, a first processed version 114 indicates that the tree object remains static, whilst the sun object moves leftwards and the person object moves rightwards by different amounts. If the person object is selected, a second processed version 116 indicates that the person object remains static, whilst the sun object and tree object are moved leftwards by different amounts.

It will therefore be seen that the post-processed images 101-104 exhibit little or no motion for objects that lie on the reference plane, i.e. are closer to the camera 33 in this example, thereby mitigating or avoiding motion sickness effects and without the need to have a mechanical means of stabilisation for this form of horizontal motion.

It will be appreciated that instead of stabilizing the position of objects located far away, or at infinity (compensating for absolute rotation), stabilization may be performed for objects that are closer to the camera. In some embodiments, the reference plane is advantageously selected based on user's expected or detected viewing location, which provides an effective way of mitigating or avoiding motion sickness.

In some embodiments, a plurality of reference depths, or objects, may be determined, and the position of content corresponding to the different respective depths or objects may be adjusted differently. According to an embodiment, an image may be divided into a plurality of reference plane images. For example, each pixel may be associated with a closest reference plane based on a depth map of a stereoscopic image. Position of each reference plane may then be adjusted as described above to stabilise the view for each reference plane image separately. The adjusted reference plane images may be combined to generate an image where objects appearing at each reference plane have been stabilized. For example, referring back to FIG. 10b, the first object corresponding to DP1 may be have its position adjusted by a first amount, and the second object corresponding to DP2 may have its position adjusted by a second amount.

The fewer the number of lenses, and the larger the separation between the lenses on the VR camera, the stronger the positive stabilizing effect. Additionally, the display can be converted to a 2D mode if the camera has been tilted and/or excessive vertical disparities are evident. In addition, stitching seam positions can be selected partially based on the VR camera motion. Stitching seams are typically the easiest to visually detect if objects closer to the VR camera are located on a seam. Often, the seam position is manually or automatically chosen so that it does not interact with objects that are very close. When the VR camera rotates, if the stitching seam position is not adjusted, it may naturally travel back and forth over some objects that are close. It is possible to avoid the resulting visual (temporal) artefact by e.g. adjusting the seam position so that its position is limited to either side of the close-by object but is not allowed to go over it.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

We claim:
1. A method comprising:
providing video data representing a plurality of frames of virtual reality content captured with a camera;
determining a reference depth within the virtual reality content; and
adjusting position of the virtual reality content in one or more frames, based on the reference depth, to compensate for movement of the camera during capture, wherein the adjusting of the position of the virtual reality content comprises:
panning the one or more frames in substantially a same direction as the movement of the camera based on the reference depth, and
panning the one or more frames in a direction substantially opposite to the movement of the camera based on an amount of the movement of the camera.

2. A non-transitory computer-readable medium comprising stored thereon computer-readable code, which, when executed with at least one processor, causes the at least one processor to perform:
provide video data representing a plurality of frames of virtual reality content captured with a camera;
determine a reference depth within the virtual reality content; and
adjust position of the virtual reality content in one or more frames, based on the reference depth, to compensate for movement of the camera during capture, wherein the adjusting of the position of the virtual reality content comprises:
panning the one or more frames in substantially a same direction as the movement of the camera based on the reference depth, and
panning the one or more frames in a direction substantially opposite to the movement of the camera based on an amount of the movement of the camera.

3. An apparatus, the apparatus having at least one processor and at least one non-transitory memory having computer-readable code stored thereon, which when executed causes the apparatus:
to provide video data representing a plurality of frames of virtual reality content captured with a camera;
to determine a reference depth within the virtual reality content;
to adjust position of the virtual reality content in one or more frames, based on the reference depth, to compensate for movement of the camera during capture, wherein the adjusting of the position of the virtual reality content comprises:
panning the one or more frames in substantially a same direction as the movement of the camera based on the reference depth, and
panning the one or more frames in a direction substantially opposite to the movement of the camera based on an amount of the movement of the camera.

4. The apparatus of claim 3, wherein the movement of the camera comprises a rotation.

5. The apparatus of claim 4, wherein the rotation comprises horizontal rotation.

6. The apparatus of claim 3, wherein the reference depth is determined based on a user input received through a user interface.

7. The apparatus of claim 6, wherein the apparatus is further caused to:
receive the user input to select an object in the virtual reality content;
determine depth of the selected object; and use the determined depth of the selected object as the reference depth.

8. The apparatus of claim 3, wherein the apparatus is further caused to identify one or more objects in the virtual reality content having one or more predetermined characteristics, and wherein the reference depth is determined based on depth of the one or more objects.

9. The apparatus of claim 8, wherein the one or more objects are identified based at least on a predetermined size or a predetermined shape.

10. The apparatus of claim 3, wherein the apparatus is caused to receive data from a user device, which data is indicative of a gaze direction of a user while consuming the virtual reality content, wherein the reference depth is determined based on the gaze direction.

11. The apparatus of claim 10, wherein the apparatus is further caused to determine a convergence depth based on the data indicative of the gaze direction, wherein the reference depth substantially corresponds to the convergence depth.

12. The apparatus of claim 10, wherein the apparatus is further caused to identify an object in the virtual reality content as a selected object based on the gaze direction;
determine depth of the selected objected; and
use the determined depth of the selected object as the reference depth.

13. The apparatus of claim 10, wherein the data indicative of the gaze direction is received from eye tracking sensors of a virtual reality headset.

14. The apparatus of claim 3, wherein the apparatus is further caused to: determine a plurality of reference depths, and wherein the position of the virtual reality content is adjusted based on a respective reference depth of the plurality of reference depths.

15. The apparatus of claim 14, wherein an amount of rotation in the direction of the movement of the camera is inversely proportional to the reference depth.

16. The apparatus of claim 3, wherein the video data is captured with a multi-camera device.

17. The apparatus of claim 3, wherein the video data comprises stereoscopic or 3D content.

* * * * *